United States Patent
Deishi et al.

(10) Patent No.: US 7,006,105 B2
(45) Date of Patent: Feb. 28, 2006

(54) COLOR CORRECTION METHOD AND COLOR CORRECTION PROGRAM TO OBTAIN DESIRED OUTPUT IMAGE

(75) Inventors: Satoshi Deishi, Ibaraki (JP); Masahiro Hayakawa, Amagasaki (JP); Toshitsugu Yamamoto, Takatsuki (JP); Kenji Masaki, Nagaokakyo (JP); Fumiko Uchino, Otokuni-Gun (JP); Naoko Hiramatsu, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 169 days.

(21) Appl. No.: 09/858,096

(22) Filed: May 15, 2001

(65) Prior Publication Data

US 2002/0000993 A1    Jan. 3, 2002

(30) Foreign Application Priority Data

May 18, 2000  (JP) .............................. 2000-146696
May 18, 2000  (JP) .............................. 2000-146697

(51) Int. Cl.
G09G 5/12        (2006.01)

(52) U.S. Cl. ..................................................... 345/590

(58) Field of Classification Search ................ 345/590, 345/581, 589; 382/162–167

See application file for complete search history.

(56) References Cited

U.S. PATENT DOCUMENTS 4,941,038 A     7/1990   Walowit ....................... 358/80
5,239,370 A *   8/1993   Yamaguchi ................. 358/518

(Continued)

FOREIGN PATENT DOCUMENTS

JP          06-046772 B2    6/1994

OTHER PUBLICATIONS

Device-directed rendering Andrew S. Glassner, Kenneth P. Fishkin, David H. Marimont, Maureen C. Stone, Jan. 1995.*
Color gamut mapping and the printing of digital color images Maureen C. Stone, William B. Cowan, John C. Beatty, Oct. 1988.*

(Continued)

*Primary Examiner*—Jeffery Brier
*Assistant Examiner*—Javid Amini
(74) *Attorney, Agent, or Firm*—Sidley Austin Brown & Wood LLP

(57) ABSTRACT

The gray axis of an input apparatus is shifted so as to match the gray axis of an output apparatus. Each data on a plane of equal lightness located in the Gamut of the input apparatus is shifted in the same direction in accordance with the shift of the gray axis by an amount of shifting smaller in proportion to greater distance from the gray axis. Therefore, the image is not governed by the chromaticness in the shifting direction even if the gray axis is shifted. Points located outside the Gamut of the output apparatus is compressed-converted into points within the Gamut (surface) where color difference is minimized while maintaining the lightness. A desired image is reproduced without inversion in the lightness after Gamut compression between data.

12 Claims, 11 Drawing Sheets

U.S. PATENT DOCUMENTS

| | | | | |
|---|---|---|---|---|
| 5,363,218 A | | 11/1994 | Hoshino | 358/518 |
| 5,450,216 A | * | 9/1995 | Kasson | 358/518 |
| H1506 H | * | 12/1995 | Beretta | 345/591 |
| 5,583,666 A | * | 12/1996 | Ellson et al. | 358/518 |
| 5,699,491 A | * | 12/1997 | Barzel | 358/1.9 |
| 5,745,263 A | | 4/1998 | Oryo | 358/518 |
| 5,963,201 A | * | 10/1999 | McGreggor et al. | 715/722 |
| 6,205,246 B1 | * | 3/2001 | Usami | 382/167 |
| 6,269,184 B1 | * | 7/2001 | Spaulding et al. | 382/167 |
| 6,459,425 B1 | * | 10/2002 | Holub et al. | 345/207 |

OTHER PUBLICATIONS

Multi-resolution multi-field ray tracing: a mathematical overview C. Gasparakis , Oct. 1999.*

* cited by examiner

COLOR CORRECTION METHOD AND COLOR CORRECTION PROGRAM TO OBTAIN DESIRED OUTPUT IMAGE

This application is based on application Nos. 2000-146696 and 2000-146697 filed in Japan, the contents of which are hereby incorporated by reference.

BACKGROUND OF THE INVENTION

1. Field of the Invention

The present invention relates to a color correction method and program, particularly to a color correction method and program used to convert digital image data that can be reproduced with an apparatus such as a CRT (cathode ray tube) into image data that can be reproduced with an output apparatus such as a printer.

2. Description of the Related Art

The reproducible range of colors with CRTs and scanners generally differ from the reproducible range of colors with printers. When the color reproducible range (Gamut) differs between two such apparatuses, color matching must be implemented to reproduce an image corresponding to one apparatus at another apparatus. The color correction method (color matching method) in conventional art will be described briefly hereinafter.

A flow of image data is shown in FIG. 9 in order to describe the color matching method between an input apparatus 701 and an output apparatus 707. Here, the image data reproduced at input apparatus 701 such as a CRT or scanner corresponds to RGB data represented by the RGB color space. The image data reproduced at output apparatus 707 such as a printer corresponds to CMYK data represented by the CMY color space. As shown in FIG. 9, the RGB data are subjected to various conversion processings at a color conversion processor 703 to be eventually converted into CMYK data.

The RGB data at input apparatus 701 is applied to color conversion processor 703 to be converted into data of a color space independent of the device. L*a*b* space and XYZ space, for example, are known as a color space independent of the device. It is assumed that the RGB data is converted into data represented by the L*a*b* space (L*a*b* data). Conversion using an LUT (lookup table) or masking and the like are employed for the conversion process.

The converted L*a*b* data is then converted at a Gamut mapping unit 705 into L*a*b* data of a range that can be reproduced by output apparatus 707. In other words, color matching is implemented between input apparatus 701 and output apparatus 707 at Gamut mapping unit 705.

Since the data subjected to color matching is still in the form of data of a color space independent of the device (L*a*b* data), the data is further converted into CMYK data. Conversion using an LUT or masking or the like is employed for the conversion process here.

Thus, the image data reproduced at input apparatus 701 is subjected to color matching so as to be reproduced at output apparatus 707 after being converted into data of a color space independent of the device.

FIG. 10 is a flow chart of a color matching process at Gamut mapping unit 705 of FIG. 7. Referring to FIG. 10, in response to the input of data independent of the device (L*a*b* data) to Gamut mapping unit 706 at step S801, the gray axis is adjusted at step S803.

More specifically, the entire input Gamut is shifted so that the gray axis of the input Gamut (Gamut of the input apparatus) matches the gray scale of the output Gamut (Gamut of the output apparatus). By setting the gray axes of input and output apparatuses 701 and 707 in coincidence, a gray-balanced output image without color fogging will be obtained.

The gray axis refers to the line segment connecting the white point and the black point of respective apparatuses. For example, in the CRT, the color when all the R, G and B are turned on corresponds to the white point whereas the color when all the R, G and B are turned off corresponds to the black point. Here, the line segment connecting both points becomes the gray axis of the CRT in the L*a*b* color space. At the printer side, the color of the paper used corresponds to the white point whereas the output black corresponds to the black point. In the same L*a*b* color space, the line segment connecting these two points is the gray axis of the printer.

At step S804, the hue is adjusted by the rotary operation and the like of the input Gamut. In accordance with the shift of the entire Gamut in the gray axis adjustment process, there is a region in which the hue changes. The hue adjustment step is implemented to correct this change in hue.

At step S805, the value which is the relative lightness or darkness of a color (referred to as "lightness" hereinafter) and chroma are adjusted. More specifically, a compression process is implemented so that the lightness and chroma of the input Gamut match the lightness and chroma of the output Gamut.

When the range of lightness differs greatly between input apparatus 701 and output apparatus 707, the problem of no-print white reproduction as caused by halation or the dark area being reproduced solidly may occur in the output image. To this end, adjustment is effected so that the lightness range conforms to output apparatus 707. Furthermore, if the range of chroma greatly differs between input apparatus 701 and output apparatus 707, the output image will become entirely too vivid to appear flat or conversely lose its chromaticness. Thus, compression adjustment is implemented also for chroma to conform to the Gamut of output apparatus 707.

Following the compression process of lightness and chroma, control proceeds to step S807 where a pasting process is implemented. Data outside the Gamut of output apparatus 707 is pasted to the Gamut surface. This process is aimed to allow the image data located outside the output Gamut and that cannot be reproduced at output apparatus 707 to be reproduced appropriately.

The color matching process will be completed at the end of the data pasting process. At step S809, image data subjected to the matching process is output.

In the foregoing, the process flow at Gamut mapping unit 705 has been described.

In the following, a gray axis adjustment process of FIG. 10 (step S803) will be described with reference to FIGS. 11–13.

FIG. 11 shows the manner of shifting the gray axis of input apparatus 701 towards the direction of the gray axis of output apparatus 707 in the L*a*b* space. In FIG. 11, the white and black points of input apparatus 701 are $P_{wi}$ and $P_{wi}$, respectively. The white and black points of output apparatus 707 are $P_{wo}$ and $P_{bo}$, respectively. Gray axis $l_i$ of input apparatus 601 connecting points $P_{wi}$ and $P_{wi}$ does not match gray axis $l_o$ of output apparatus 707 connecting points $P_{wo}$ and $P_{bo}$.

Therefore, the data on gray axis $l_i$ is shifted parallel to the plane of a*b* so that gray axis $l_i$ matches gray axis $l_o$. More specifically, each data point on gray axis $l_i$ is moved to a point on gray axis $l_o$ with its lightness maintained constant. For example, point $P_1$ on gray axis $l_i$ is shifted to point $P_1'$ of equal lightness on gray axis $l_o$. Similarly, points $P_2$ and $P_3$ on gray axis $l_i$ are moved to points $P_2'$ and $P_3'$, respectively, of equal lightness on gray axis $l_o$.

FIG. 12 shows a cross section of the input Gamut in the L*a*b* space prior to the gray axis shift operation. Here, a cross section of the input Gamut on a plane of equal lightness parallel to plane a*b* is shown. The region Gin enclosed by a hexagon represents the input Gamut. A point P therein is the point where the gray axis of the input Gamut crosses. It is to be noted that the point where the gray axis of the output Gamut crosses the plane of equal lightness is point P', and does not match point P.

FIG. 13 shows a cross section of the input Gamut in the L*a*b* space after the gray axis shift operation. A cross section of the input Gamut on a plane of equal lightness corresponding to FIG. 12 is shown. The region Gin enclosed by a hexagon in a dotted line represents the input Gamut prior to shifting of FIG. 12 whereas the region Gin' enclosed by a hexagon in a solid line represents the input Gamut after the shifting operation.

By the gray axis adjust process, the entire data in region Gin of the input Gamut is moved so that point P matches point P' on the plane of equal lightness at the output Gamut. More specifically, all the data at the plane of equal lightness are shifted in parallel with a vector similar to the vector corresponding to the shift of the gray axis (the arrow from point P to P'). Therefore, point q, for example, on region Gin of the input Gamut is shifted to point q'.

By shifting the entire input Gamut so that the gray axis of the input Gamut matches the gray axis of the output Gamut, a gray-balanced output image with no color fogging can be obtained.

The pasting process into the Gamut of FIG. 10 (step S807) (referred to as "Gamut compression process" hereinafter) will be described. The geometrical Gamut compression process of the conventional art is mainly classified into the four methods set forth below.

First method: input image data is compressed with a predetermined ratio towards the center point of the output Gamut.

Second method: chroma of the input image data is compressed towards the gray axis of the output Gamut without changing the hue of the input image data.

Third method: the lightness is compressed without changing the hue of the input image data.

Fourth method: the input image data is converted to be located in the output Gamut such that the color difference is minimized.

The above first and fourth methods will be described in further detail with reference to FIGS. 14–18.

FIG. 14 is a diagram to describe a Gamut compression process according to the first method. For the sake of simplification, a configuration that has two united cones with a circle on a plane parallel to the a*b* plane as the bottom is represented as the output Gamut Gout. Point P is a point outside output Gamut Gout. Point P' is a point within output Gamut Gout (a point on the surface of Gout). In FIG. 14, the axes passing through the centroid Q of output Gamut Gout are assigned a* and b* to indicate the chromaticity.

Point P is compressed with a predetermined compression ratio in the direction of centroid Q which is the center point of compression on a plane H of equal hue including point P and lightness axis L*.

FIG. 15 shows this compression on plane H of equal hue. As shown in FIG. 15, point P outside output Gamut Gout is compressed in the direction of centroid Q to be converted into point P' located in output Gamut Gout.

FIG. 16 is a diagram to describe a Gamut compression process according to the fourth method. For the sake of simplification, a configuration that has two hexagonal pyramids united with a hexagon on a plane parallel to plane a*b* as the bottom is represented as output Gamut Gout. Point P is a point located outside output Gamut Gout, and point P' is a point located in output Gamut Gout (a point on the surface of Gout) with the smallest color difference ΔE from point P. As indicated by the arrow, point P outside output Gamut Gout is converted into point P'. Similarly in FIG. 16, the axes passing through the centroid of output Gamut Gout are assigned a* and b* to indicate the chromaticity.

Color difference ΔE between points P and P' is generally represented as $\Delta E=((P(L^*)-P'(L^*))^2+(P(a^*)-P'(a^*))^2+(P(b^*)-P'(b^*))^2)^{1/2}$. Here, P(L*), P(a*) and P(b*) are the values of the L* component, a* component and b* component, respectively, of the L*a*b* space at point P. Similarly, P'(L*), P'(a*) and P'(b*) are the values of the L* component, a* component and b* component, respectively, at point P'.

This manner is shown in FIGS. 17 and 18 represented at plane L*b* and plane a*b*, respectively. Referring to FIGS. 17 and 18, point P located outside output Gamut Gout is converted into point P' located within output Gamut Gout corresponding to the smallest color difference ΔE from point P. This method differs from the first method in that there is no centroid of compression, and compression is effected in a direction not towards the centroid.

The image of the color can be represented appropriately by converting data located outside output Gamut into data located in output Gamut so that the color difference is minimized.

However, the conventional color correction method (color matching method) including gray axis adjustment and Gamut compression was not sufficient for the purpose of reproducing an image appropriately and easily at the output apparatus.

More specifically, gray axis adjustment causes the entire input Gamut to be moved according to the shift of the gray axis, so that other colors will be converted into slightly different colors. For example, in FIG. 13, point q in input Gamut prior to the shift becomes point q' after the shift by the gray axis adjustment process. In this case, the blue color achieved at the input apparatus 701 will be reproduced as the color of purple at output apparatus 707. In the event that input apparatus 701 is a CRT and output apparatus 707 is a printer, a thoroughly reddish output image will be produced by the shift of the gray axis.

Thus, when the input Gamut is shifted by the gray axis adjustment process, the reproduced output image will be governed by the chromaticness in the shifting direction, resulting in an image slightly different from the input image.

The hue adjustment process to correct this difference requires the Gamut rotary operation and the like. Therefore, the process becomes very complicated and is extremely time consuming. Even if this complicated hue adjustment is applied, it was difficult to obtain an appropriate rendition of the image. For example, if the entire image is rotated in order to output blue as blue at the output side, the green color will be represented yellowish in color.

Furthermore, there was the case where the image retained by the input apparatus is ruined since the gray axis of the input Gamut is set to exactly match the gray axis of the output Gamut. Although a gray-balanced image without any color fogging can be obtained by adjusting the gray axis, the human viewer of the output image will probably be not satisfied. This is because the human observer possibly bears the image reproduced at the input apparatus and will be bothered by a feeling of strangeness when an image is reproduced that completely ruins the former image of the input apparatus.

Furthermore, since all the data located in the Gamut of the input apparatus are compressed at a predetermined compression ratio to come within the output Gamut according to the first and second methods of Gamut compression, an extremely large compression ratio will be set in practice. This induces the problem that the reproduced image will have extremely low chroma.

According to the third method of Gamut compression, there will be some image data such as the blue color of high chroma that cannot come into the output Gamut even if the lightness is compressed. There was a problem that such blue color cannot be reproduced at the output apparatus.

As to the fourth method of Gamut compression, there is a case where there is a relatively great difference in lightness before and after the compression process, particularly so great that the lightness is inverted. There was a problem that an image differing from the actual image that was observed by a human viewer is output.

SUMMARY OF THE INVENTION

In view of the foregoing, an object of the present invention is to provide a color correction method and program that can, even when the gray axis is shifted, readily reproduce a desired image without being governed by the chromaticness in the shifting direction.

Another object of the present invention is to provide a color correction method and program that can, even when the gray axis is shifted, reproduce a desired image by maintaining to some extent the image retained by the apparatus.

A further object of the present invention is to provide a color correction method and program that can reproduce a desired image by implementing Gamut compression appropriately.

The above objects of the present invention can be achieved by a color correction method including steps set forth in the following. According to an aspect of the present invention, a color correction method of correcting image data prepared for a first apparatus having a first Gamut indicative of a range of reproducible colors so as to be applied to a second apparatus having a second Gamut indicative of a range of reproducible colors includes the steps of entering image data prepared for the first apparatus, shifting the entered image data by a conversion that shifts the gray axis of the first Gamut towards the gray axis of the second Gamut. The image data is shifted according to an amount of shifting corresponding to the distance from the gray axis of the first Gamut in the chroma direction.

Here, the gray axis of the first Gamut refers to a line segment connecting a white point and a black point defined by the first apparatus whereas the gray axis of the second Gamut refers to a line segment connecting white and black points defined by the second apparatus.

According to the present invention, in moving all the image data in the Gamut of the first apparatus so that the gray axis of the first Gamut is shifted in the direction of the gray axis of the second Gamut, each image data is shifted according to an amount of shifting corresponding to the distance from the gray axis of the first Gamut in the direction of chroma.

Since each image data is shifted according to an appropriate amount of shifting corresponding to the distance from the gray axis in the direction of chroma, the problem of image data of high chroma being greatly shifted to be converted into image data of no chromaticness is eliminated. Since the chromaticness does not have to be corrected, the hue correction which is complicated and time consuming is dispensable.

Thus, a color correction method is provided that can, even when the gray axis is shifted, readily reproduce a desired image without being governed by the chromaticness in the shifting direction.

Preferably, the color correction method further includes the steps of further compressing the converted image data in the directions of lightness and chroma so as to be applied to the second apparatus, pasting image data that does not come into the second Gamut even by compression in the compression step to the surface of the second Gamut, and providing image data corrected through the pasting step.

According to the present invention, the converted image data is further compressed in the directions of lightness and chroma so as to be applied to the second apparatus, and image data that does not come into the second Gamut even by the compression is pasted on the surface of the second Gamut. Image data subjected to these steps is then output. Therefore, a desired image can be reproduced through an appropriate color correction process.

Preferably, the amount of shifting is characterized in that it becomes smaller in proportion to a greater distance from the gray axis of the first Gamut in the chroma direction. Therefore the problem of an image corresponding to image data of high chroma being reproduced in different color due to the image data of high chroma being greatly shifted can be avoided.

Preferably, the step of shifting is characterized in that the input image data is shifted so that the gray axis of the first Gamut exactly matches the gray axis of the second Gamut.

Since all the image data located in the Gamut of the first apparatus is shifted so that the gray axis of the first apparatus matches the gray axis of the second axis, a gray-balanced image with no color fogging can be reproduced at the second apparatus.

Further preferably, the step of shifting is characterized in that the input image data is shifted so that the gray axis of the first Gamut is shifted to a location that does not completely match the gray axis of the second Gamut.

Since all the image data in the color reproducible range of the first apparatus are shifted so that the gray axis of the first apparatus is shifted to a location in the direction of the gray axis of the second apparatus and that does not exactly match the gray axis of the second apparatus, the problem of the image retained at the first apparatus being ruined can be prevented while establishing gray balance to some extent.

Preferably, the step of shifting is characterized in that the gray axis of the first apparatus is shifted by an amount of shifting in the ratio of 0.5–0.9 with respect to the amount of shifting when the gray axis of the first Gamut matches the gray axis of the second Gamut.

Accordingly, an appropriate image is reproduced in accord with the gray balance and the former image of the first apparatus.

Preferably, the step of shifting is characterized in that the white point of the first Gamut is set to coincide with the white point of the second Gamut.

Accordingly, the gray axis of the first apparatus is shifted so as not to match the gray axis of the second apparatus while only the white point on the gray axis of the first apparatus is set to coincide with the white point on the gray axis of the second apparatus. Thus, the image of the first apparatus can be maintained to a certain degree without ruining the human observer's sensation to white.

Preferably, the step of shifting is characterized in that the input image data is shifted in a color space absent from the first and second apparatuses.

Further preferably, the color space absent from the first and second apparatuses includes a Lab color space.

Since the step of shifting is carried out in a color space such as the Lab space absent from the apparatus, image data in the color reproducible range of the first apparatus can be appropriately and easily converted into image data in a color reproducible range of the second apparatus.

According to another aspect of the present invention, a color correction method of correcting image data prepared for a first apparatus having a first Gamut indicative of a range of reproducible colors so as to be applied to a second apparatus having a second Gamut indicative of a range of reproducible colors includes the steps of entering image data prepared for the first apparatus, and shifting the entered image data by a conversion of shifting a gray axis of the first Gamut towards the gray axis of the second Gamut. This conversion shifts the gray axis of the first apparatus to a location not completely matching the gray axis of the second apparatus.

According to this present aspect, all the data located in the first Gamut are shifted so that the gray axis of the first Gamut is shifted in the direction of the gray axis of the second Gamut and to a location not exactly matching the gray axis of the second Gamut. Therefore, a desired image can be obtained that does not ruin the former image of the first apparatus while establishing the gray balance to some extent.

Therefore, a color correction method is provided that can, even when the gray axis is shifted, reproduce a desired image by maintaining the image retained by the first apparatus to some extent.

Preferably, the step of shifting is characterized in that the gray axis of the first apparatus is shifted by an amount of shifting in the ratio of 0.5–0.9 with respect to the amount of shifting when the gray axis of the first Gamut matches the gray axis of the second Gamut.

Accordingly, an appropriate image can be reproduced in accord with the gray balance and the image retained by the first apparatus.

Preferably, the step of shifting is characterized in that the white point of the first Gamut is set to coincide with the white point of the second Gamut.

Accordingly, the gray axis of the first Gamut is shifted so as not to exactly match the gray axis of the second Gamut while only the white point on the gray axis of first Gamut is set to coincide with the white point on the gay axis of the second Gamut. Therefore, the image retained by the first apparatus can be maintained to some extent without ruining the human observer's sensation to white.

According to a further aspect of the present invention, a computer program causes a computer to execute a color correction process of correcting image data prepared for a first apparatus having a first Gamut indicative of a range of reproducible colors so as to be applied to a second apparatus having a second Gamut indicative of a range of reproducible colors. The color correction process includes the steps of receiving image data prepared for the first apparatus, and shifting the received image data by a conversion of shifting a gray axis of the first Gamut towards the gray axis of the second Gamut. The image data is shifted according to an amount of shift corresponding to the distance from the gray axis of the first Gamut in the direction of chroma.

According to the invention of the present aspect, each image data is shifted according to an amount of shifting corresponding to the distance from the gray axis of the first Gamut in the direction of chroma in the process of shifting all image data located in the Gamut of first apparatus so that the gray axis of the first Gamut is shifted in the direction of the gray axis of the second Gamut.

Since each image data is shifted according to an appropriate amount of shifting corresponding to the distance from the gray axis in the direction of chroma, the problem of image data corresponding to high chroma being greatly shifted to be converted into image data of completely different chromaticness is eliminated. Furthermore, since it is not necessary to correct the chromaticness, the hue correction that is complicated and time consuming is dispensable.

Thus, a color correction program is provided that can, even when the gray axis is shifted, readily reproduce a desired image without being governed by the color in the shifting direction.

According to still another aspect of the present invention, a computer program causes a computer to execute a color correction process of correcting image data prepared for a first apparatus having first Gamut indicative of a range of reproducible colors so to be applied to a second apparatus having a second Gamut indicative of a range of reproducible colors. The color correction process includes the steps of receiving image data prepared for the first apparatus, and shifting the received image data by a conversion of shifting a gray axis of the first Gamut towards the gray axis of the second Gamut. This conversion shifts the gray axis of the first Gamut to a location not completely matching the gray axis of the second Gamut.

According to the invention of the present aspect, all the image data located in the first Gamut are shifted so that the gray axis of the first Gamut is shifted in the direction of the gray axis of the second Gamut and to a position not matching the gray axis of the second Gamut. Therefore, a desired image can be obtained that does not ruin the image retained by the first apparatus while establishing gray balance to some degree.

Thus, a color correction program is provided that can reproduce, even when the gray axis is shifted, a desired image by maintaining the image retained by the first apparatus to some degree.

According to a still further aspect of the present invention, a color correction method corrects image data prepared for a first apparatus having a first Gamut indicative of a range of reproducible colors so as to be applied to a second apparatus having a second Gamut indicative of a range of reproducible colors. The color correction method includes the steps of entering image data located in the first Gamut, processing the entered image data using a predetermined technique so as to be applied to the second apparatus, and compressing image data that does not come into the second Gamut by the processing step using a predetermined technique to be located in the second Gamut so that color difference is minimized while maintaining lightness.

According to the invention of the present aspect, image data prepared for the first apparatus and that does not come into the second Gamut is compressed to be located in the second Gamut so that color difference is minimized while maintaining the lightness. Since the lightness does not change, the problem of lightness being inverted will not occur. An image of natural gradation can be obtained. Furthermore, since compression is effected so that the color difference becomes as small as possible, the image of color can be represented appropriately.

A color correction method that can reproduce a desired image can be provided by implementing the compression step appropriately.

Preferably, the predetermined technique includes the step of shifting the received image data by the conversion of shifting the gray axis of the first Gamut towards the gray axis of the second Gamut.

Accordingly, a gray-balanced output image without any color fogging can be obtained since the received image data is shifted by the conversion of shifting the gray axis.

Preferably, the step of processing is characterized in that compression is implemented in a color space with autonomous lightness.

Preferably, the color space with autonomous lightness is a Lab color space.

According to the invention of the present aspect, a step of compression is implemented in a color space such as a Lab color space with autonomous lightness. Therefore, data is to be converted and compressed within a color reproducible range of the second apparatus where color difference is minimized in a plane of equal lightness. The compression process can be implemented readily and appropriately.

According to yet a further aspect of the present invention, a computer program causes a computer to execute a color correction process of correcting image data prepared for a first apparatus having a first Gamut indicative of a range of reproducible colors so as to be applied to a second apparatus having a second Gamut indicative of a range of reproducible colors. The color correction process includes the steps of receiving image data in the first Gamut, processing the received image data using a predetermined technique so as to be applied to the second apparatus, and compressing image data that does not come into the second Gamut by the process using the predetermined technique to be located in the second Gamut so that the color difference is minimized while maintaining the lightness.

According to the invention of the present aspect, image data related to the first apparatus and that does not come into the color reproducible range of the second apparatus is converted to be located within the color reproducible range of the second apparatus so that the color difference is minimized while maintaining the lightness. Since the lightness is not altered, the problem of lightness being inverted will not occur. An image of natural gradation can be obtained. Furthermore, since compression is implemented so that color difference is as small as possible, the image of color can be represented appropriately.

Thus, a color correction program is provided that can reproduce a desired image by appropriately implementing a compression step.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings.

First Embodiment

Figure 1:
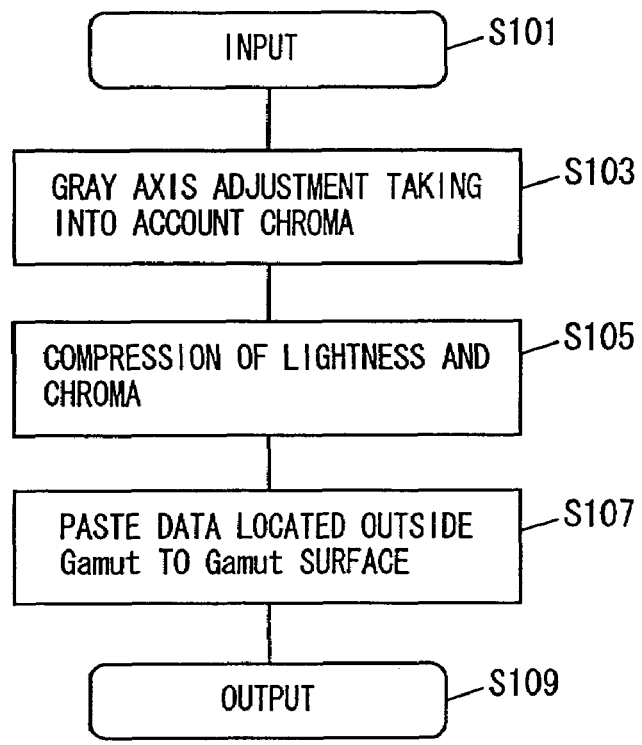
FIG. 1 is a flow chart of the entire process of a color matching method according to a first embodiment of the present invention.
Figure 6:
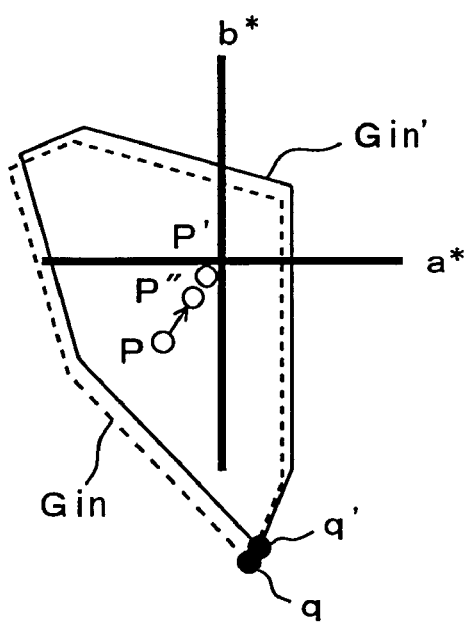
FIG. 6 is a cross sectional view of an input Gamut on a plane of equal lightness parallel to a plane a*b* after shifting the gray axis according to a second embodiment of the present invention.

The process represented in FIG. 1 is carried out at a Gamut mapping unit 605 shown in FIG. 6.

Referring to FIG. 1, in response to the input of data independent of the device (here, L*a*b* data) at step S101, control proceeds to step S103 where the gray axis is adjusted taking into account the chroma. This is to establish the gray balance of the reproduced output image by matching the gray axes of the input and output apparatuses.

Figure 7:
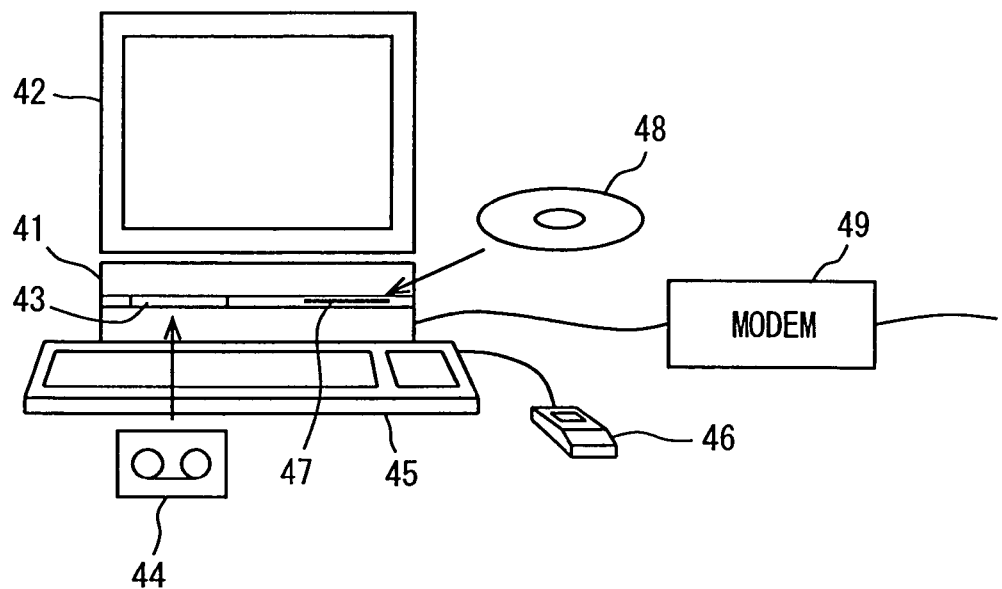
FIG. 7 shows an appearance of a computer to execute a color matching method.

It is to be noted that in the present step the entire input Gamut is not simply shifted similar to the shifting of the gray axis as in the conventional gray axis adjustment process (such as step S703 in FIG. 7). Each data in the input Gamut is shifted by an amount of shifting determined according to the chroma (the distance from the gray axis of each data in the direction of chroma). The details will be described afterwards.

Following the gray axis adjustment, control proceeds to step S105 skipping the hue adjustment process (step S804 of FIG. 10) that was carried out conventionally.

At step S105, adjustment of lightness and chroma is carried out. More specifically, compression processing is implemented to cause the lightness and chroma of the input Gamut to match the lightness and chroma of the output Gamut. By compressing the range of lightness in accordance with that of the output apparatus, the inconvenience of a region reproduced as no-print white or the dark region being represented solidly seen in the output image can be prevented. Furthermore, by adjusting the range of chroma corresponding to that of the output apparatus, an output image of natural color can be reproduced.

Following the compression process of lightness and chroma, control proceeds to step S107 to paste data located outside the Gamut of the output apparatus into the Gamut. This pasting process is effected to appropriately reproduce the input image data located outside the output Gamut and that cannot be reproduced at the output apparatus.

The color matching process is completed at the end of the data pasting process. At step S109, the resultant image data after the matching process is output.

The foregoing is the schematic flow of the process of the color matching method of the present invention.

The gray axis adjustment process taking into consideration the chroma (step S103 of FIG. 1) will be described with reference to FIG. 2. The position relationship between gray axis $l_i$ of the input apparatus and gray axis $l_o$ of the output apparatus in the L*a*b* space prior to gray axis adjustment is similar to that shown in FIG. 8. As mentioned previously, each data in the input Gamut is shifted on a plane of equal lightness, i.e. maintaining the lightness, by the gray axis adjustment process.

Figure 2:
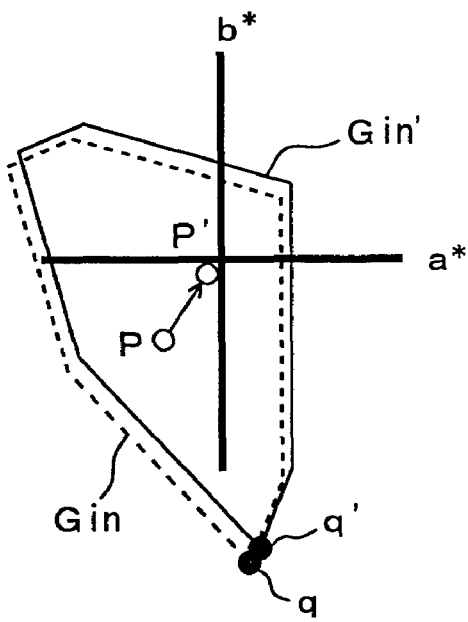
FIG. 2 shows a cross sectional view of an input Gamut on a plane of equal lightness parallel to an a*b* plane in a L*a*b* space after gray axis adjustment.

FIG. 2 shows a cross section of an input Gamut on a plane of equal lightness parallel to plane a*b* in the L*a*b* space after the gray axis is adjusted. Region Gin enclosed by the hexagon in a dotted line represents the input Gamut prior to shifting whereas region Gin' enclosed by the hexagon in a solid line represents the input Gamut after the shifting process. Points P and P' are points where the respective gray axes of the input apparatus and the output apparatus cross on a plane of equal lightness.

As shown in FIG. 2, input Gamut Gin is shifted so that point P matches point P'. Each data in the input Gamut on the plane of equal lightness is shifted in the same direction in accordance with the shift of the gray axis. The shifting amount varies according to the distance from point P.

More specifically, the shifting amount of each data becomes smaller in proportion to greater distance from the gray axis (point P) of the input Gamut. The shifting amount $\Delta$ of each data is determined according to the relationship of $\Delta=\alpha\times\beta/(d+\beta)$, for example, where $\alpha$ is the shifting amount of the gray axis on a plane of equal lightness.

Here, d is the distance of the data of the pixel of interest from the gray axis on a plane of equal lightness. In FIG. 2, d is the distance from point P. $\beta$ is an arbitrary constant such as the numeric of 1 to 3.

By shifting each data point in the input Gamut according to such a relationship, point P will match point P' while points corresponding to high chroma hardly move. For example, point q of high chroma is just shifted to a close point q' even after the gray axis adjustment process.

This means that there is no great change in chromaticness. The phenomenon of blue being shifted to purple is prevented. Furthermore, an image established in gray balance can be obtained since the gray axis of the input apparatus matches the gray axis of the output apparatus.

By carrying out such a gray axis adjustment, an image established in gray balance can be obtained while obviating the phenomenon of blue being shifted to purple in the printout.

Figure 10:
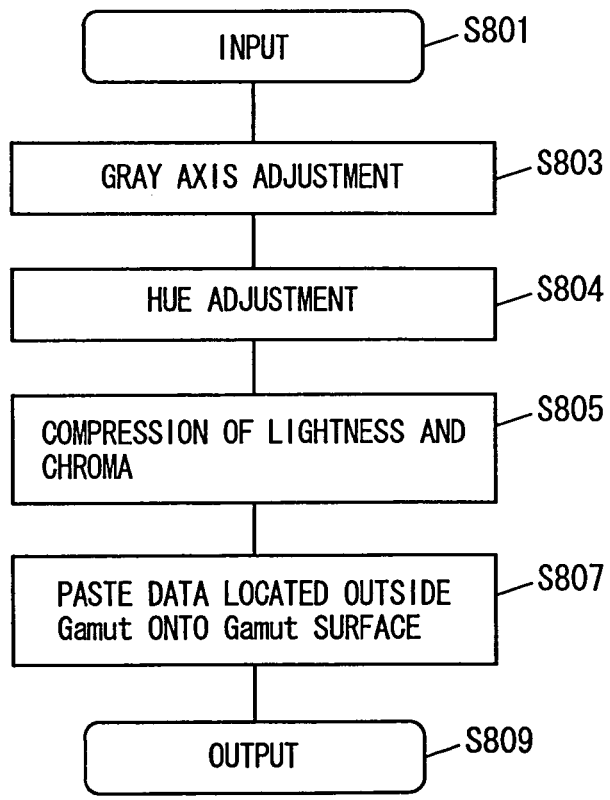
FIG. 10 is a flow chart of a color matching process at a Gamut mapping unit 705 of FIG. 9.

Conventionally, the Gamut rotary operation as shown in step S804 of FIG. 10 was required to adjust the hue. This was extremely time consuming since a combination of trigonometric functions is employed for the rotary operation. The present embodiment is advantageous in that hue adjustment by rotary operation is dispensable since data conversion corresponding to chroma is effected simultaneous to the gray axis shift process. Therefore, data can be converted using only the arithmetic operation. The time required for processing can be shortened.

The present invention is not limited to the above-described embodiment in which the amount of shifting of each data point is determined according to the aforementioned equation. Any relationship in which the amount of shifting becomes smaller in proportion to being farther away from the gray axis can be employed.

Therefore, the shifting amount $\Delta$ of each data may be determined according to the equation of $\Delta=\alpha(1-d/\beta)$, for example, where $\alpha$ is the shifting amount of the gray axis on a plane of equal lightness. Here, d is the distance of a data point of the pixel of interest from the gray axis on a plane of equal lightness. $\beta$ is an arbitrary constant. For example, $\beta$ takes a numeric large enough such as 150 so that the shifting distance from the gray axis becomes 0.

The Gamut compression process (the process of pasting data located outside the Gamut into the Gamut) (step S107 of FIG. 1) will be described hereinafter with reference to FIGS. 3–5.

Figure 3:
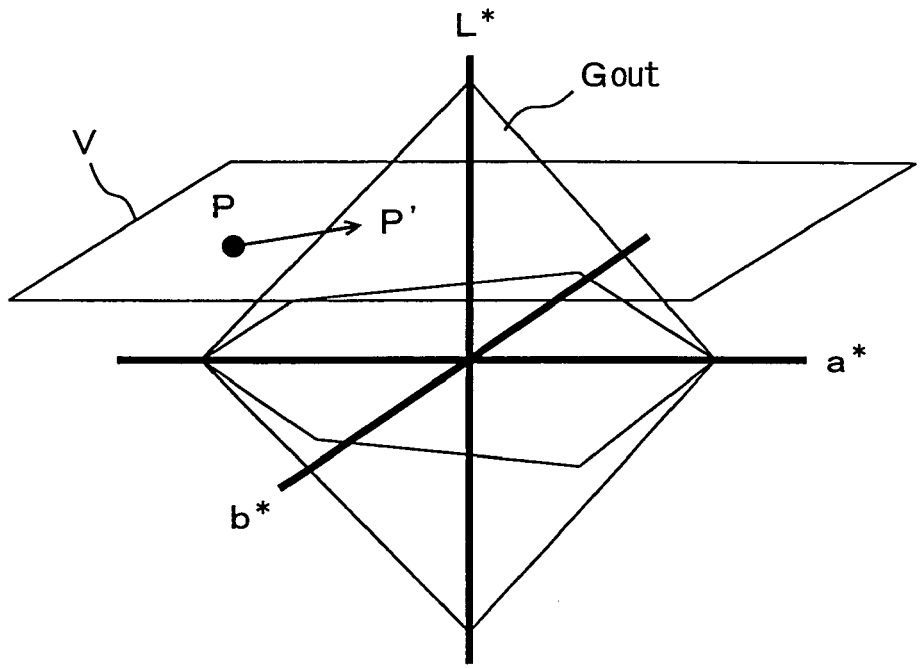
FIG. 3 shows the manner of a Gamut compression process carried out in a L*a*b* space.

FIG. 3 represents the manner of the Gamut compression process in the L*a*b* space. For the sake of simplification, a configuration that has two hexagonal pyramids united with a hexagon as the bottom is represented as the output Gamut Gout. As indicated by the arrow in FIG. 3, a point P located outside the output Gamut Gout is converted into point P' in output Gamut Gout (surface).

Point P' is located on a plane V of lightness equal to that of point P, and has the smallest color difference $\Delta E$ from point P on plane V of equal lightness. Color difference $\Delta E$ between points P and P' is represented by $\Delta E=((P(a^*)-P'(a^*))^2+(P(b^*)-P'(b^*))^2)^{1/2}$.

Figure 4:
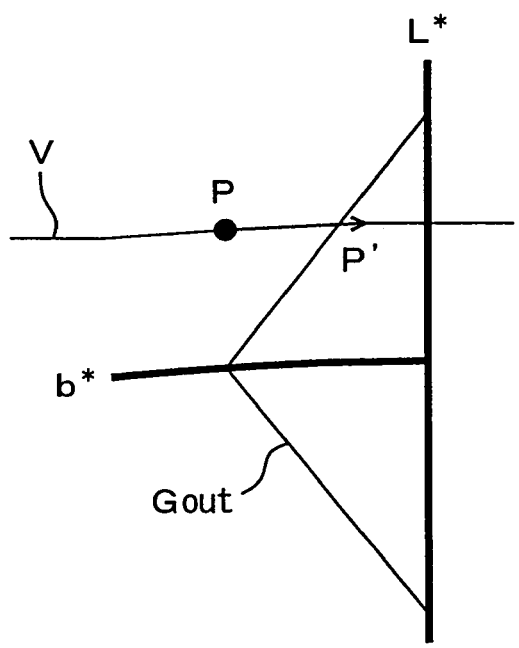
FIG. 4 shows the manner of point P being converted at a plane L*b*.

FIG. 4 represents the manner of conversion of point P at a plane L*b*. As shown in FIG. 4, point P is shifted on plane V of equal lightness. Therefore, points located outside the output Gamut Gout have their lightness maintained constant even if converted to a point in Gout. Therefore, the lightness will not be inverted between data.

Figure 5:
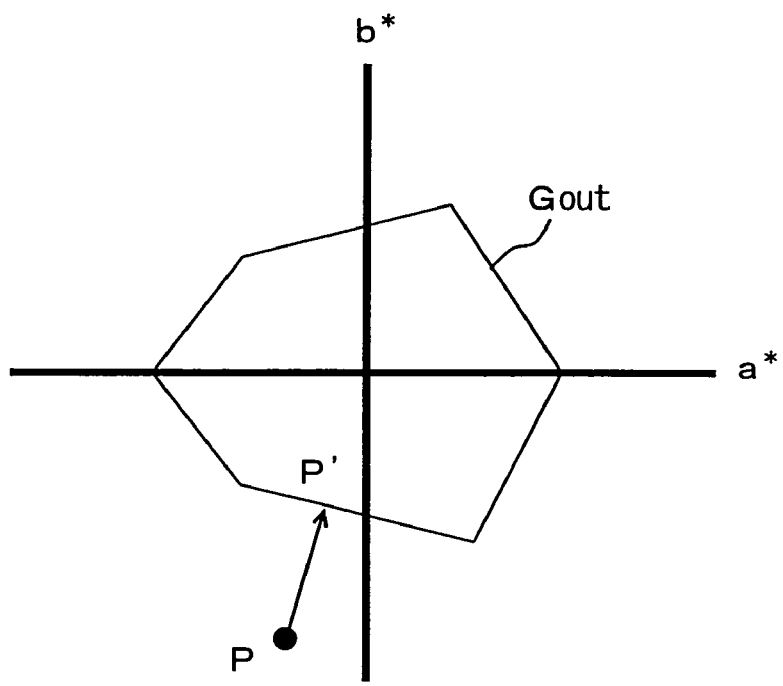
FIG. 5 shows the manner of point P being converted at a plane V of equal lightness.

FIG. 5 shows the manner of point P being converted at plane V of equal lightness. As shown in FIG. 5, point P is pasted onto the surface of output Gamut such that color difference $\Delta E$ is minimized at the plane of equal lightness. The image of color can be reproduced appropriately since color change is suppressed.

Since conversion that minimizes color difference while maintaining lightness is effected in the Gamut compression process, the image of the color reproduced at the input apparatus can be reproduced appropriately at the output apparatus. Furthermore, since the lightness information is not altered, the disadvantage of the lightness being inverted is prevented. An image of natural gradation can be obtained.

Second Embodiment

A color matching method according to a second embodiment of the present invention will be described here. The process flow of the color matching method of the present embodiment is similar to that of the first embodiment shown in FIG. 1, provided that the contents of the gray axis adjustment process taking into account the chroma (step S103 of FIG. 1) differ. In the color matching method of the present embodiment, the gray axis of the input Gamut, when shifted, is not set to completely match the gray axis of the output Gamut.

This gray axis adjustment process of the second embodiment will be described hereinafter with reference to FIG. 6. The position relationship between gray axis $l_i$ of the input apparatus and gray axis $l_o$ of the output apparatus in the L*a*b* space prior to the gray axis adjustment is similar to that shown in FIG. 8. Also, each data in the input Gamut is shifted on a plane of equal lightness, i.e. maintaining the lightness, in the gray axis adjustment process.

FIG. 6 shows a cross section of the input Gamut on a plane of equal lightness parallel to plane a*b* after the gray axis shifting operation. Region Gin enclosed by a hexagon in a dotted line represents the input Gamut prior to shifting whereas region Gin' enclosed by a hexagon in a solid line represents the input Gamut after shifting. Points P and P' indicate points where the gray axes of the input apparatus and output apparatus cross on a plane of equal lightness.

In contrast to the shift shown in FIG. 2, point P is shifted to a point P" on a line segment connecting points P and P', instead of being shifted to point P'. In other words, the gray axis of the input apparatus is not set to completely coincide with the gray axis of the output apparatus, and is shifted to a position at the forward side of the gray axis of the output apparatus.

For example, as to the CRT of 9300 K, the human observer is aware that the screen thereof is blue. If each data is shifted so that the gray axis of the CRT completely matches the gray axis of the printer which is the output apparatus, the blue tone of the CRT will be ruined. By setting the shifting amount of the gray axis smaller than the distance up to the gray axis of the output apparatus, the tone of the CRT is to be maintained.

Each data located in the input Gamut is shifted in the shifting direction of the gray axis by a shifting amount determined according to the distance from the gray axis, as in the previous first embodiment shown in FIG. 2. The second embodiment is under control so that the shifting amount of each data becomes smaller in proportion to greater distance from the gray axis (point P) of the input Gamut.

More specifically, the shifting amount $\Delta$ of each data is determined according to the equation of $\Delta=\alpha\times\beta/(d+\beta)$, for example, where $\alpha$ is the shifting amount of the gray axis on a plane of equal lightness.

Here, d is the distance between the data point of a pixel of interest and the gray axis on a plane of equal lightness. In FIG. 6, d is the distance from point P. $\beta$ is an arbitrary constant such as 1 to 3.

The shifting amount $\alpha$ of the gray axis is determined by $\alpha=\alpha'\times\epsilon$, where $\alpha'$ is the distance between the gray axis of the input apparatus and the gray axis of the output apparatus on a plane of equal lightness. In FIG. 6, $\alpha'$ is the distance between points P and P'. $\epsilon$ is an arbitrary constant smaller than 1, and is at least 0.3 and less than 1. From the result of experiments, $\epsilon$ is preferably 0.5 to 0.9.

In FIG. 6, the shifting amount $\alpha$ of the gray axis is a distance between points P and P". By setting the shifting amount of the gray axis shorter than the distance between points P and P', the tone of the image represented at the input apparatus such as a CRT can be left in the output image.

According to the present embodiment, the image perceived at the input apparatus can be maintained to some extent while suppressing the phenomenon of the blue color being shifted to purple.

Although an example applied to the gray axis adjustment process taking into account the chroma shown in step S103 of FIG. 1 has been described, application to the gray axis adjustment process of the conventional art (step S803 of FIG. 10) is also allowed.

In the case of application to step S803 of FIG. 10, the gray axis of the input apparatus is shifted to a position short of the gray axis of the output apparatus, provided that each data located in the input Gamut is shifted in parallel by a shifting amount similar to the shifting amount of the gray axis on a plane of equal lightness. Since undesirable change in chromaticness occurs here, the hue adjustment process (step S804 of FIG. 10) is then implemented.

[Modification]

A modification of the second embodiment will be described below. In a color matching method of the present modification, the gray axis of the input Gamut Gout is shifted, not to the exact position of the gray axis of the output apparatus, but to a position at the forward side of the gray axis of the output apparatus. In the modification, it is to be noted that the white point alone of the gray axis of the input apparatus is set to coincide with the white point of the gray axis of the output apparatus. In other words, the gray axis of the input apparatus is shifted to a position short of the gray axis of the output apparatus with only the white point of the input apparatus matching the white point on the gray axis.

If the white points are not set to match, the region that is originally white will be output as a colored region. For example, in the case where an input image having text on a white base is provided and a printer is employed for the output apparatus, color fogging will appear in the white base portion on the output sheet.

To avoid this disadvantage, the gray axis of the input Gamut is shifted, not to the exact location of the gray axis of the output apparatus, but to a location at the forward side of the gray axis of the output apparatus that is determined by a predetermined ratio, and only the white point is set to coincide with the white point of the output apparatus. It is to be noted that each data located in the input Gamut is shifted on a plane of equal lightness by a shifting amount corresponding to the distance from the gray axis at a plane of equal lightness.

Accordingly, white color alone can be set to coincide with the white at the output apparatus while maintaining the image obtained by the input apparatus such as a CRT. Thus, a more agreeable image as a whole can be obtained.

The color correction method (color matching method) described above is realized by a program to execute the above-described series of processes. There are cases where the color matching methods are executed on a computer.

FIG. 7 shows an appearance of a computer to execute the above-described color matching method. The computer generally includes a main unit 41, a magnetic tape device 43, a CD-ROM (Compact Disc-Read Only Memory) device 47, a display 42 such as a CRT, a keyboard 45, a mouse 46 and a modem 49. A magnetic tape 44 is loaded in magnetic tape device 43. A CD-ROM 48 is mounted in CD-ROM device 47.

Figure 8:
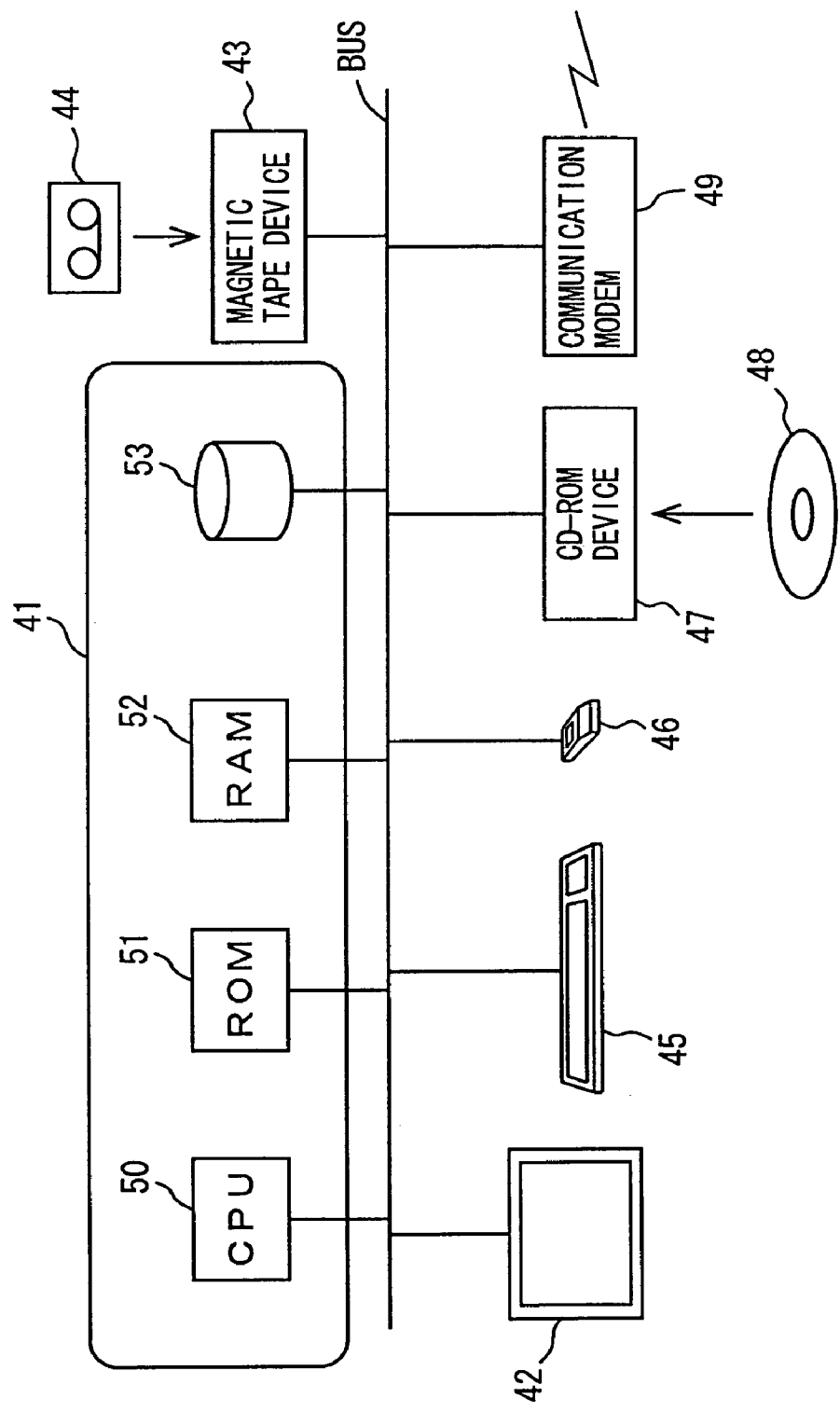
FIG. 8 is a functional block diagram of the structure of the computer of FIG. 7.

FIG. 8 shows the functional block of the structure of this computer. Referring to FIG. 8, main unit 41 of the computer includes a CPU (Central Processing Unit) 50, an ROM (Read Only Memory) 51, an RAM (Random Access Memory) 52, and a hard disk device 53, all which are connected to each other through a bus.

The color matching program of the present invention may be installed in advance in hard disk device 53, or recorded in a detachable recording medium such as CD-ROM 48 or magnetic disk 44.

In the case of the latter, the recorded program is first read out from the recording medium by magnetic tape device 43, CD-ROM device 47 or the like to be stored in hard disk device 53. Then, the program is loaded into RAM 52 from hard disk device 53, likewise the case where the program is already installed in hard disk device 53. The program is executed and controlled by CPU 50.

The recording medium recorded with the program includes, for example, a tape system such as a magnetic tape or cassette tape, a disk system such as a magnetic disk (flexible disk, hard disk device and the like) or optical disk (CD-ROM/MO/MD/DVD and the like), a card system such as an IC card (including memory card) or optical card, or a medium retaining a program fixedly such as a semiconductor memory or the like including a mask ROM, EPROM, EEPROM and flash ROM.

Furthermore, a medium retaining a program dynamically may be used. The program is downloaded from a network via a communication modem 49. In the case where the program is downloaded from a network, the program for downloading is prestored in main unit 41 of the computer or installed in main unit 41 from another recording medium.

The contents stored in the recording medium are not limited to a program. Data can be stored in the recording medium.

Although the color matching method of the present invention is suitable in the case where color image information represented at a CRT or the like is recorded onto a sheet by a printer or the like, the cover matching method is applicable to any apparatus as long as color matching is to be effected between apparatuses having different ranges of reproducible colors.

Figure 9:
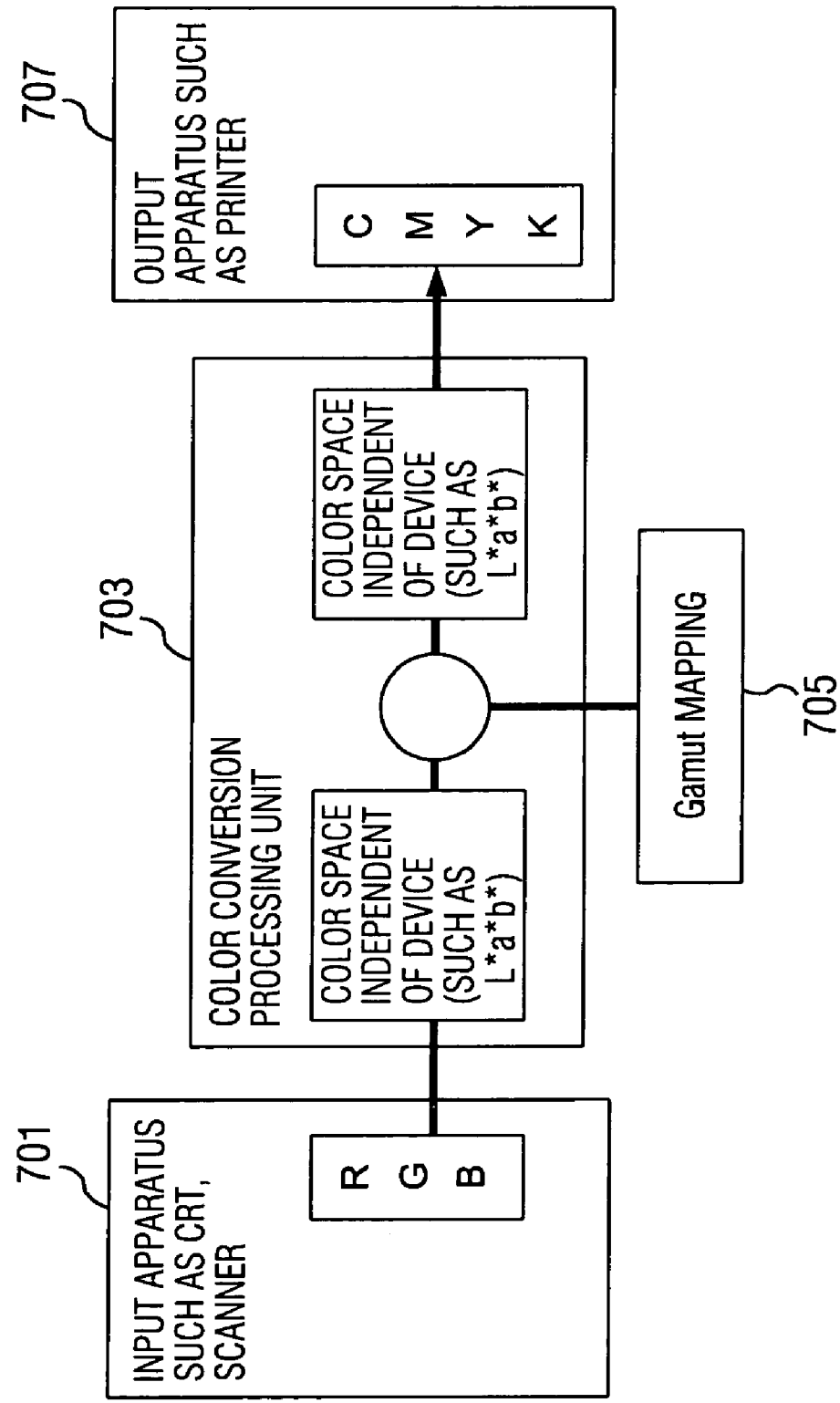
FIG. 9 shows the flow of image data to describe the color matching method between input apparatus 701 and output apparatus 707.
Figure 11:
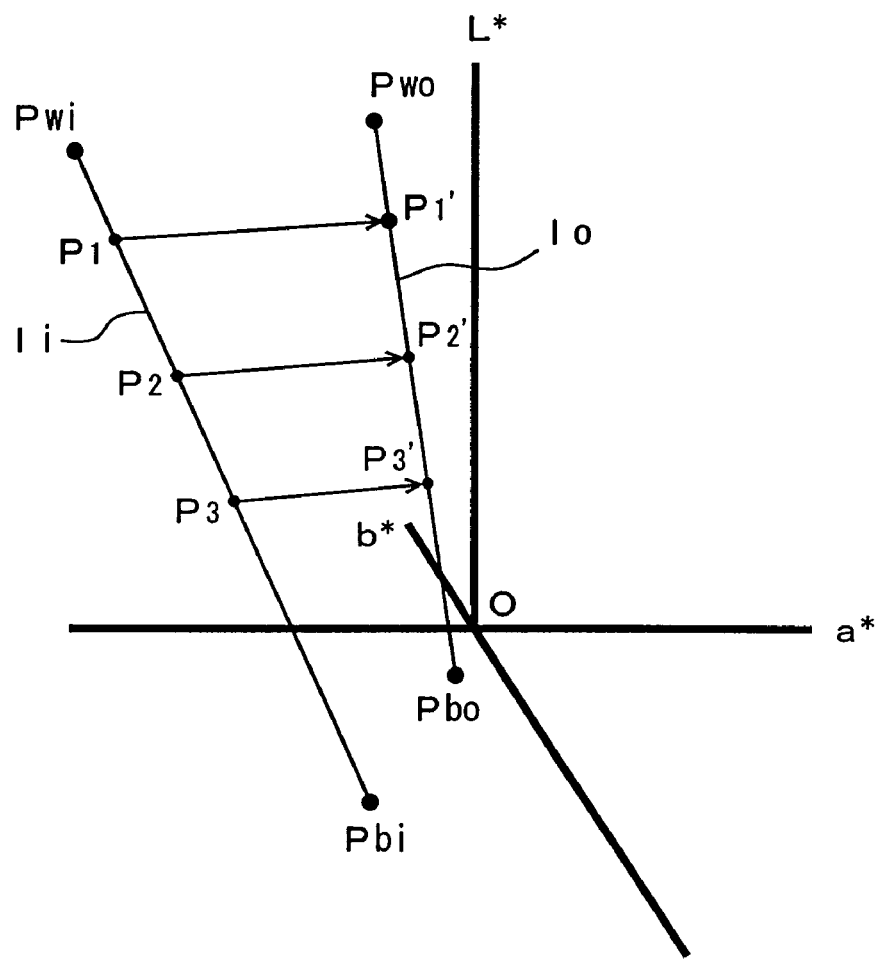
FIG. 11 shows the manner of the gray axis of input apparatus 701 shifted in the direction of the gray axis of output apparatus 707 in an L*a*b* space.
Figure 12:
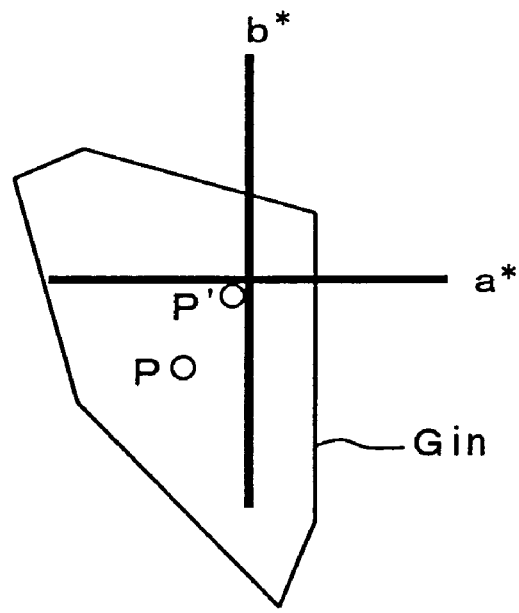
FIG. 12 is a sectional view of an input Gamut at the L*a*b* space prior to shifting the gray axis.
Figure 13:
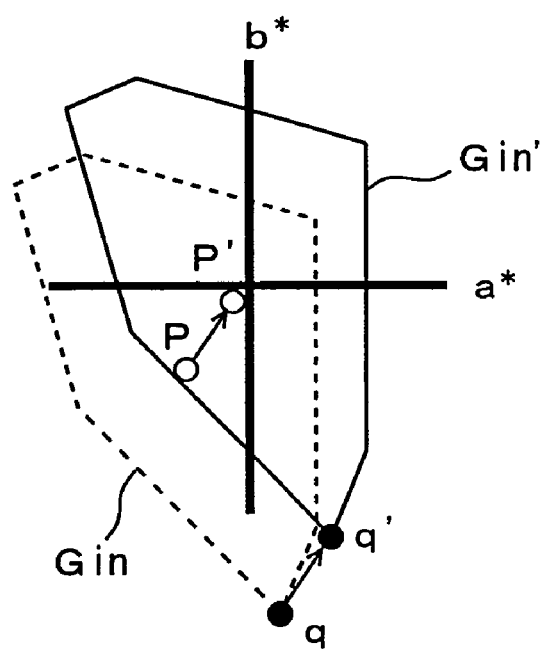
FIG. 13 is a sectional view of an input Gamut at the L*a*b* space after shifting the gray axis.
Figure 14:
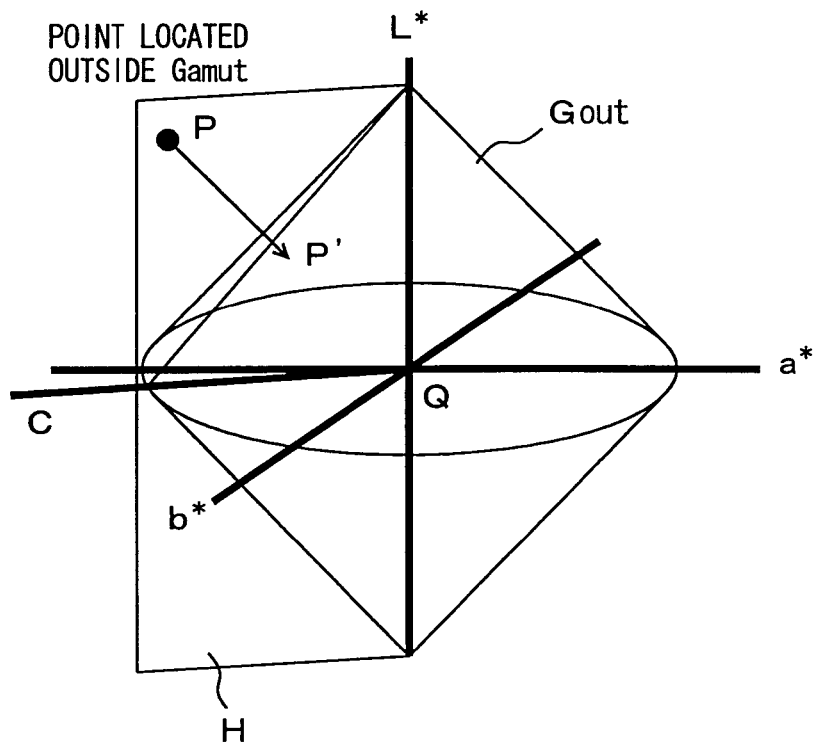
FIG. 14 is a diagram to describe a Gamut compression process according to the first method.
Figure 15:
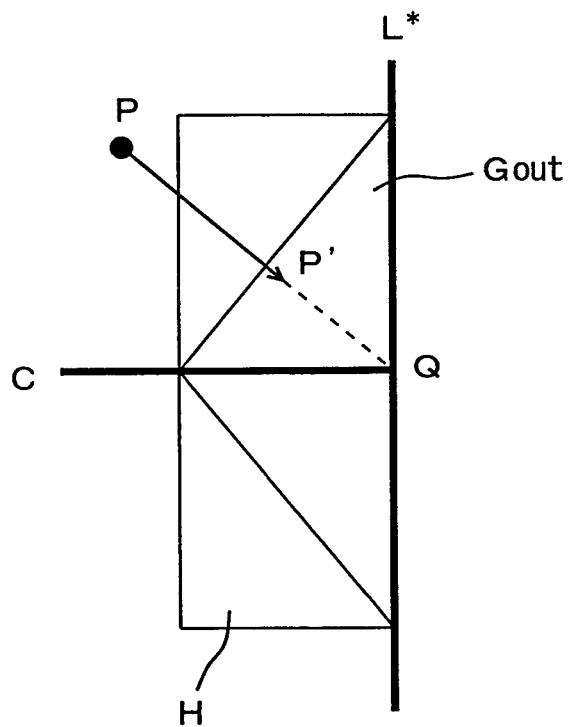
FIG. 15 shows the manner of point P compressed on a plane H of equal hue with a predetermined compression ratio in the direction of the centroid Q.
Figure 16:
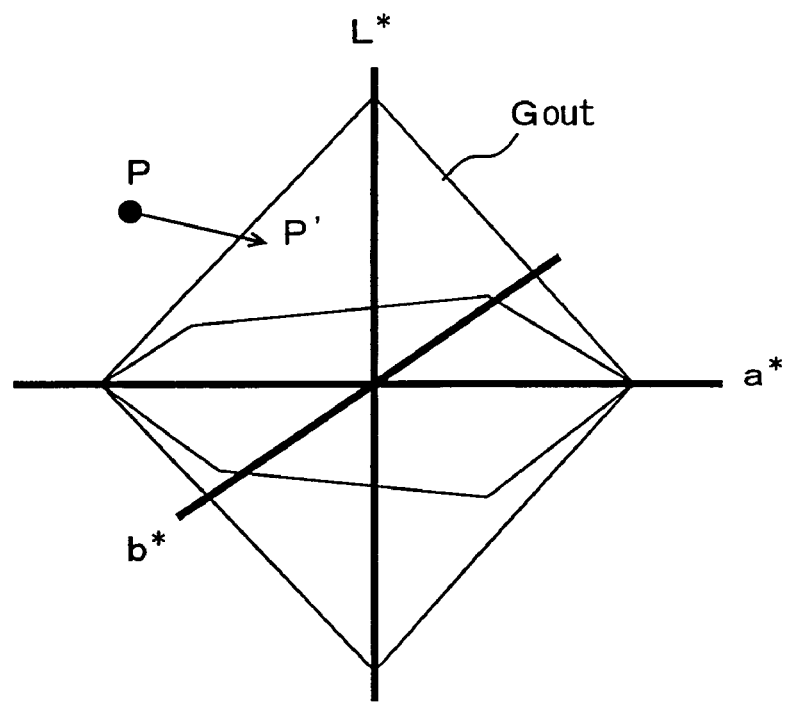
FIG. 16 is a diagram to describe a Gamut compression process according to the fourth method.
Figure 17:
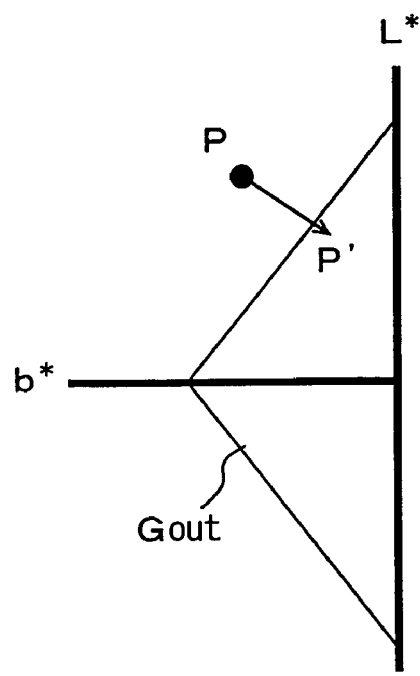
FIGS. 17 and 18 show the manner of the Gamut compression process of the fourth method represented at a plane L*b* and at a plane of equal hue parallel to plane a*b*, respectively.
Figure 18:
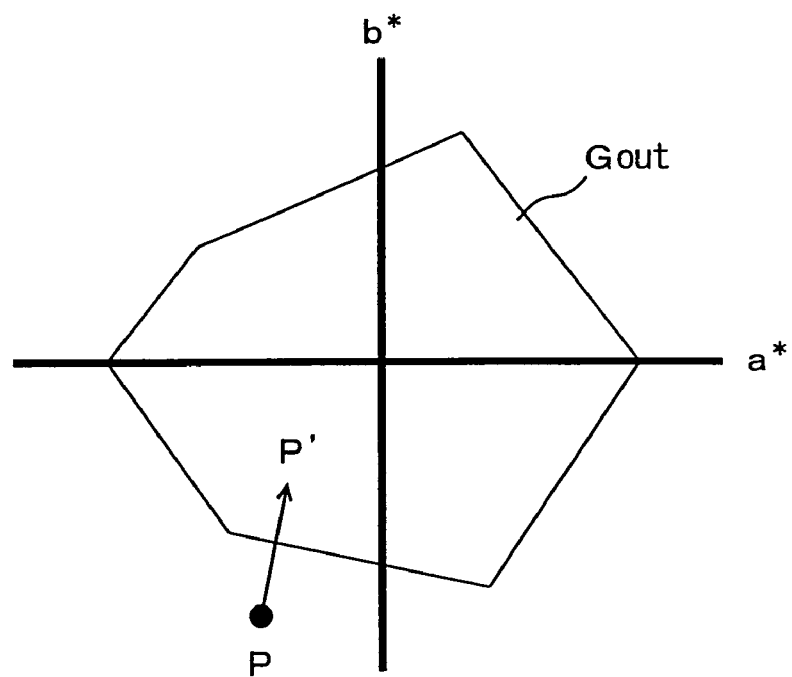

The color matching process shown in FIG. 1 has been described as being carried out at Gamut matching unit 705 of FIG. 9. However, it will be understood that such description is merely exemplary, and is also applicable to a color conversion process, for example, depending upon the type of process of FIG. 1. The present invention is applicable to the conversion of L*a*b* data represented in L*a*b* space into CMYK data represented in the CMY space.

Also, the color matching method of the present invention is not limited to the process shown in the flow chart of FIG. 1. The present invention is applicable in the case where the gray axis adjustment process (step S103) and the compression process of lightness or the like (step S105) are carried out simultaneously, or in the case where the processing sequence is offset.

It is to be also noted that the present invention is applicable to the process shown by the flow chart of FIG. 10. More specifically, the Gamut compression process of the present embodiment can be applied to the Gamut compression process (step S807) in a color matching method including a conventional general gray axis adjustment process that does not take into account the chroma (step S803) and a hue adjustment process (step S804).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A color correction method of correcting image data prepared for a first apparatus having a first Gamut indicative of a range of reproducible colors so as to be applied to a second apparatus having a second Gamut indicative of a range of reproducible colors, said color correction method comprising the steps of:
   entering image data prepared for said first apparatus, and
   shifting said entered image data by a conversion of shifting a gray axis of said first Gamut towards a gray axis of said second Gamut,
   wherein said image data is shifted according to an amount of shifting corresponding to a distance from the gray axis of said first Gamut in a chroma direction, wherein said shifting step shifts the gray axis of said first apparatus by the amount of shifting in a ratio of 0.5 to 0.9 with respect to the amount of shifting when the gray axis of said first Gamut matches the gray axis of said second Gamut.

2. The color correction method according to claim 1, further comprising the steps of:
   compressing said image data in directions of lightness and chroma, and
   pasting said compressed image data that do not come into said second Gamut to a surface of said second Gamut.

3. The color correction method according to claim 1, wherein said shifting step shifts colors of said image data so that the gray axis of said first Gamut matches the gray axis of said second Gamut.

4. The color correction method according to claim 1, wherein said shifting step shifts colors of said image data so that the gray axis of said first Gamut is shifted to a position not completely matching the gray axis of said second Gamut.

5. The color correction method according to claim 1, wherein said shifting step sets a white point of said first Gamut to coincide with the white point of said second Gamut.

6. The color correction method according to claim 5, wherein said amount of shifting becomes smaller in proportion to a greater distance from the gray axis of said first Gamut in the chroma direction.

7. The color correction method according to claim 1, further comprising converting colors in said image data to a device independent representation prior to said shifting step.

8. The color correction method according to claim 7, wherein said device independent representation includes a Lab color representation.

9. A color correction method of correcting image data prepared for a first apparatus having a first Gamut indicative of a range of reproducible colors so as to be applied to a second apparatus having a second Gamut indicative of a range of reproducible colors, said color correction method comprising the steps of:
   entering image data prepared for said first apparatus, and
   shifting said entered image data by a conversion of shifting a gray axis of said first Gamut towards a gray axis of said second Gamut, wherein said conversion is a conversion of shifting the gray axis of said first Gamut to a position not completely matching the gray axis of said second apparatus, and wherein said shifting step shifts the gray axis of said first apparatus by the amount of shifting in a ratio of 0.5 to 0.9 with respect to the amount of shifting when the gray axis of said first Gamut matches the gray axis of said second Gamut.

10. A computer-readable medium encoded with a computer program causing a computer to execute a color correction process of correcting image data prepared for a first apparatus having a first Gamut indicative of a range of reproducible colors so as to be applied to a second apparatus having a second Gamut indicative of a range of reproducible colors, said color correction process comprising the steps of:

receiving image data prepared for said first apparatus, and shifting said received image data by a conversion of shifting a gray axis of said first Gamut towards a gray axis of said second Gamut, wherein said shifting step shifts the gray axis of said first Gamut by the amount of shifting in a ratio of 0.5 to 0.9 with respect to the amount of shifting when the gray axis of said first Gamut matches the gray axis of said second Gamut, and wherein a position of each of said image data along said gray axis is maintained when said image data is shifted.

11. The computer program according to claim 10, further comprising converting said image data to a color representation with autonomous lightness.

12. The computer program according to claim 11, wherein said color representation with autonomous lightness is a Lab representation.

* * * * *